United States Patent
Seeboth et al.

(10) Patent No.: US 10,968,333 B2
(45) Date of Patent: Apr. 6, 2021

(54) ALKOXYSILANE POLYSULPHIDE (71) Applicant: Compagnie Generale des Etablissements Michelin, Clermont-Ferrand (FR)

(72) Inventors: Nicolas Seeboth, Clermont-Ferrand (FR); Anne-Frédérique Salit, Clermont-Ferrand (FR); Sylvain Mayer, Clermont-Ferrand (FR); José Manuel Antelo Miguez, Coruna (ES); Pablo Barreiro, Galicia (ES); Benigno A. Janeiro, Forcarei (ES)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/470,107

(22) PCT Filed: Dec. 8, 2017

(86) PCT No.: PCT/FR2017/053471
§ 371 (c)(1),
(2) Date: Jun. 14, 2019

(87) PCT Pub. No.: WO2018/109335
PCT Pub. Date: Jun. 21, 2018

(65) Prior Publication Data
US 2019/0359791 A1 Nov. 28, 2019

(30) Foreign Application Priority Data
Dec. 16, 2016 (FR) ...................................... 1662583

(51) Int. Cl.
*C07F 7/18* (2006.01)
*C07F 7/08* (2006.01)
(Continued)

(52) U.S. Cl.
CPC ................ *C08K 5/548* (2013.01); *B60C 1/00* (2013.01); *C07F 7/1804* (2013.01); *C07F 7/188* (2013.01);
(Continued)

(58) Field of Classification Search
None
See application file for complete search history.

(56) References Cited

U.S. PATENT DOCUMENTS

| | | | |
|---|---|---|---|
| 4,595,740 A | 6/1986 | Panster | |
| 5,227,425 A | 7/1993 | Rauline | |

(Continued)

FOREIGN PATENT DOCUMENTS

| | | |
|---|---|---|
| CN | 1474824 A | 2/2004 |
| CN | 1478125 A | 2/2004 |

(Continued)

OTHER PUBLICATIONS

US 5,191,205 A1, 02/2001, Micouin et al. (withdrawn)
(Continued)

*Primary Examiner* — Richard A Huhn
(74) *Attorney, Agent, or Firm* — Venable LLP

(57) ABSTRACT

The invention relates to an alkoxysilane polysulfide, of formula (I):

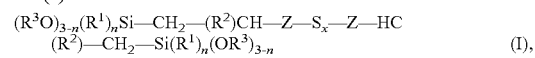

in which: $R^1$, which are identical or different, each represent a monovalent hydrocarbon group having from 1 to 18 carbon atoms; $R^2$, which are identical or different, each represent a monovalent hydrocarbon group having from 1 to 4 carbon atoms; $R^3$, which are identical or different, each represent a monovalent hydrocarbon group having from 1 to 12 carbon atoms, preferably from 1 to 6 carbon atoms; Z, which are identical or different, each represent a divalent (Continued)

hydrocarbon bonding group comprising from 1 to 16 carbon atoms; x is an integral or fractional number greater than or equal to 2; and n is an integer equal to 0, 1 or 2.

20 Claims, 2 Drawing Sheets

(51) Int. Cl.

| | | |
|---|---|---|
| *B60C 1/00* | (2006.01) | |
| *C08F 236/06* | (2006.01) | |
| *C08K 5/5419* | (2006.01) | |
| *C08K 5/372* | (2006.01) | |
| *C08L 9/00* | (2006.01) | |
| *C08J 3/24* | (2006.01) | |
| *C08K 5/548* | (2006.01) | |
| *C08K 3/36* | (2006.01) | |
| *C08K 13/02* | (2006.01) | |
| *C08L 9/06* | (2006.01) | |
| *C08F 36/08* | (2006.01) | |
| *C08F 236/10* | (2006.01) | |
| *C08L 7/00* | (2006.01) | |
| *C08F 36/06* | (2006.01) | |
| *C08F 236/12* | (2006.01) | |

(52) U.S. Cl.
CPC ............... *C08F 36/08* (2013.01); *C08K 3/36* (2013.01); *C08K 13/02* (2013.01); *C08L 9/00* (2013.01); *C08L 9/06* (2013.01); *B60C 1/0016* (2013.01); *C07F 7/081* (2013.01); *C08F 36/06* (2013.01); *C08F 236/06* (2013.01); *C08F 236/10* (2013.01); *C08F 236/12* (2013.01); *C08F 2810/20* (2013.01); *C08J 3/24* (2013.01); *C08J 2307/00* (2013.01); *C08J 2309/00* (2013.01); *C08K 5/372* (2013.01); *C08K 5/5419* (2013.01); *C08L 7/00* (2013.01); *C08L 2312/00* (2013.01); *C08L 2312/08* (2013.01); *C08L 2666/44* (2013.01)

(56) References Cited

U.S. PATENT DOCUMENTS

| | | | |
|---|---|---|---|
| 5,534,592 A * | 7/1996 | Halasa | C08F 36/04 152/905 |
| 5,852,099 A | 12/1998 | Vanel | |
| 5,900,449 A | 5/1999 | Custodero et al. | |
| 5,977,238 A | 11/1999 | Labauze | |
| 6,013,718 A | 1/2000 | Cabioch et al. | |
| 6,156,822 A | 12/2000 | Materne et al. | |
| 6,313,205 B1 | 11/2001 | Chiron et al. | |
| 6,344,506 B2 | 2/2002 | Vasseur | |
| 6,420,488 B1 | 7/2002 | Penot | |
| 6,503,973 B2 | 1/2003 | Robert et al. | |
| 6,536,492 B2 | 3/2003 | Vasseur | |
| 6,747,087 B2 | 6/2004 | Custodero et al. | |
| 6,765,045 B1 | 7/2004 | Daniel et al. | |
| 6,774,255 B1 | 8/2004 | Tardivat et al. | |
| 6,815,473 B2 | 11/2004 | Robert et al. | |
| 6,835,769 B2 | 12/2004 | Custodero et al. | |
| 6,890,981 B1 | 5/2005 | Luginsland | |
| 7,135,517 B2 | 11/2006 | Simonot et al. | |
| 7,199,175 B2 | 4/2007 | Vasseur | |
| 7,202,295 B2 | 4/2007 | Simonot et al. | |
| 7,256,233 B2 | 8/2007 | Simonot et al. | |
| 7,312,264 B2 | 12/2007 | Gandon-Pain | |
| 7,425,313 B2 | 9/2008 | Custodero et al. | |
| 7,488,768 B2 | 2/2009 | Tardivat et al. | |
| 7,659,417 B2 * | 2/2010 | Guennouni | C07F 7/188 556/427 |
| 7,820,771 B2 | 10/2010 | Lapra et al. | |
| 7,900,667 B2 | 3/2011 | Vasseur | |
| 8,344,063 B2 | 1/2013 | Marechal et al. | |
| 8,394,903 B2 | 3/2013 | Marechal | |
| 8,455,584 B2 | 6/2013 | Robert et al. | |
| 8,492,479 B2 | 7/2013 | Robert et al. | |
| 9,303,148 B2 | 4/2016 | Cambon et al. | |
| 2001/0034389 A1 | 10/2001 | Vasseur | |
| 2001/0036991 A1 | 11/2001 | Robert et al. | |
| 2001/0039308 A1 | 11/2001 | Custodero et al. | |
| 2001/0056138 A1 | 12/2001 | Vasseur | |
| 2002/0004549 A1 | 1/2002 | Custodero et al. | |
| 2002/0183436 A1 | 12/2002 | Robert et al. | |
| 2003/0202923 A1 | 10/2003 | Custodero et al. | |
| 2003/0212185 A1 | 11/2003 | Vasseur | |
| 2004/0030017 A1 | 2/2004 | Simonot et al. | |
| 2004/0051210 A1 | 3/2004 | Tardivat et al. | |
| 2005/0171264 A1 | 8/2005 | Simonot et al. | |
| 2006/0009564 A1 | 1/2006 | Simonot et al. | |
| 2006/0089445 A1 | 4/2006 | Gandon-Pain | |
| 2007/0112120 A1 | 5/2007 | Vasseur | |
| 2008/0132644 A1 | 6/2008 | Lapra et al. | |
| 2009/0131572 A1 | 5/2009 | Cambon et al. | |
| 2009/0270558 A1 | 10/2009 | Gandon-Pain et al. | |
| 2010/0184912 A1 | 7/2010 | Marechal et al. | |
| 2010/0216935 A1 | 8/2010 | Boswell et al. | |
| 2010/0249270 A1 | 9/2010 | Robert et al. | |
| 2010/0252156 A1 | 10/2010 | Robert et al. | |
| 2011/0251354 A1 | 10/2011 | Marechal | |
| 2011/0319646 A1 | 12/2011 | Boswell et al. | |
| 2018/0282525 A1 | 10/2018 | Sato et al. | |
| 2019/0233618 A1 | 8/2019 | Seeboth et al. | |

FOREIGN PATENT DOCUMENTS

| | | |
|---|---|---|
| CN | 1993416 A | 7/2007 |
| CN | 101331141 A | 12/2008 |
| EP | 0098947 A1 | 1/1984 |
| EP | 0501227 A1 | 9/1992 |
| EP | 0669338 A1 | 8/1995 |
| EP | 0735088 A1 | 10/1996 |
| EP | 0810258 A1 | 12/1997 |
| EP | 0881252 A1 | 12/1998 |
| EP | 1002836 A1 | 5/2000 |
| EP | 1043357 A1 | 10/2000 |
| EP | 1127909 A1 | 8/2001 |
| EP | 1326871 A0 | 7/2003 |
| EP | 1326914 B1 | 6/2006 |
| FR | 2094859 | 2/1972 |
| FR | 2740778 | 5/1997 |
| FR | 2765882 | 1/1999 |
| GB | 1310379 | 3/1973 |
| WO | 97/36724 A2 | 10/1997 |
| WO | 99/02590 A1 | 1/1999 |
| WO | 99/02601 A1 | 1/1999 |
| WO | 99/02602 A1 | 1/1999 |
| WO | 99/16600 A1 | 4/1999 |
| WO | 99/28376 A1 | 6/1999 |
| WO | 00/05300 A1 | 2/2000 |
| WO | 00/05301 A1 | 2/2000 |
| WO | 00/53671 A1 | 9/2000 |
| WO | 00/73372 A1 | 12/2000 |
| WO | 00/73373 A1 | 12/2000 |
| WO | 01/92402 A1 | 12/2001 |
| WO | 02/10269 A2 | 2/2002 |
| WO | 02/053634 A1 | 7/2002 |
| WO | 2004003067 A1 | 1/2004 |
| WO | 2004/056915 A1 | 7/2004 |
| WO | 2004/096865 A2 | 11/2004 |
| WO | 2005/118598 A1 | 12/2005 |
| WO | 2006/013056 A1 | 2/2006 |
| WO | 2006/069792 A1 | 7/2006 |
| WO | 2006/069793 A1 | 7/2006 |
| WO | 2008/141702 A1 | 11/2008 |
| WO | 2009/000750 A1 | 12/2008 |
| WO | 2009/000752 A1 | 12/2008 |
| WO | 2010/072761 A1 | 7/2010 |
| WO | 2017033815 A1 | 3/2017 |

(56) References Cited

OTHER PUBLICATIONS

International Search Report dated Feb. 22, 2018 in corresponding PCT/FR2017/053471 (4 pages).
S. Brunauer, et al., "Adsorption of Gases in Multimolecular Layers", J. Am. Chem. Soc., vol. 60, pp. 309-319 (1938).
R. Mildenberg, et al., Hydrocarbon Resins, VCH, New York, chapter 5 (1997).

* cited by examiner

ALKOXYSILANE POLYSULPHIDE

BACKGROUND

The present invention relates to polyfunctional coupling agents which can be used in particular for the coupling of reinforcing inorganic fillers and diene elastomers in rubber compositions intended, for example, for the manufacture of tyres.

It is known that, generally, in order to obtain the optimum reinforcing properties conferred by a filler, it is advisable for the latter to be present in the elastomeric matrix in a final form which is both as finely divided as possible and as homogeneously distributed as possible. In point of fact, such conditions can only be achieved in so far as the filler exhibits a very good ability, on the one hand, to be incorporated in the matrix during the mixing with the elastomer and to deagglomerate and, on the other hand, to disperse homogeneously in this matrix.

In an entirely known way, carbon black exhibits such abilities, which is not generally the case with inorganic fillers. This is because, for reciprocal affinity reasons, the inorganic filler particles have an unfortunate tendency to clump together in the elastomeric matrix. These interactions have the harmful consequence of limiting the dispersion of the filler and thus the reinforcing properties to a level substantially lower than that which it would be theoretically possible to achieve if all the (inorganic filler/elastomer) bonds capable of being created during the compounding operation were actually obtained. These interactions moreover tend to increase the consistency in the raw state of the rubber compositions and thus to make them more difficult to process than in the presence of carbon black.

Since fuel savings and the need to protect the environment have become a priority, it has, however, proved necessary to produce tyres having a reduced rolling resistance, without adversely affecting their wear resistance. This has been made possible in particular by virtue of the discovery of novel rubber compositions reinforced with specific inorganic fillers described as "reinforcing" which are capable of rivalling, from the reinforcing viewpoint, a conventional tyre-grade carbon black, while offering these compositions a lower hysteresis, which is synonymous with a lower rolling resistance for the tyres comprising them.

Such rubber compositions, comprising reinforcing inorganic fillers of siliceous or aluminous type, have, for example, been described in Patents or Patent Applications EP-A-0 501 227 (or U.S. Pat. No. 5,227,425), EP-A-0 735 088 (or U.S. Pat. No. 5,852,099), EP-A-0 810 258 (or U.S. Pat. No. 5,900,449), EP-A-0 881 252, WO99/02590, WO99/02601, WO99/02602, WO99/28376, WO00/05300 or WO00/05301.

Mention will in particular be made of the documents EP-A-0 501 227, EP-A-0 735 088 or EP-A-0 881 252, which disclose diene rubber compositions reinforced with highly dispersible precipitated silicas, such compositions making it possible to manufacture treads having a markedly improved rolling resistance, without affecting the other properties, in particular those of grip, endurance and wear resistance. Such compositions, exhibiting such a compromise in conflicting properties, are also described in Applications EP-A-0 810 258 and WO99/28376 with, as reinforcing inorganic fillers, specific highly-dispersible aluminous fillers (aluminas or aluminium (oxide) hydroxides), or also in Applications WO00/73372 and WO00/73373, which describe specific titanium oxides of the reinforcing type.

The use of these specific highly dispersible inorganic fillers, as predominant or non-predominant reinforcing filler, has admittedly reduced the difficulties in processing the rubber compositions comprising them but this processing nevertheless remains more difficult than for the rubber compositions conventionally comprising carbon black as filler.

In particular, it is necessary to use a coupling agent, also known as bonding agent, which has the role of providing the bonding between the surface of the inorganic filler particles and the elastomer, while facilitating the dispersion of this inorganic filler within the elastomeric matrix.

It should be remembered here that the term "coupling agent" (inorganic filler/elastomer) has to be understood as meaning, in a known way, an agent capable of establishing a satisfactory bond, of chemical and/or physical nature, between the inorganic filler and the diene elastomer; such an at least bifunctional coupling agent has, for example, the simplified general formula "Y—W—X", in which:

Y represents a functional group ("Y" functional group) which is capable of being bonded physically and/or chemically to the inorganic filler, it being possible for such a bond to be established, for example, between a silicon atom of the coupling agent and the surface hydroxyl (OH) groups of the inorganic filler (for example the surface silanols, when silica is concerned);

X represents a functional group ("X" functional group) which is capable of being bonded physically and/or chemically to the diene elastomer, for example via a sulfur atom;

W represents a divalent group which makes it possible to connect Y and X.

The coupling agents should in particular not be confused with simple covering agents for inorganic filler which, in a known way, can comprise the Y functional group, active with regard to the inorganic filler, but are devoid of the X functional group, active with regard to the diene elastomer.

Coupling agents, in particular silica/diene elastomer coupling agents, have been described in a large number of documents, the most well-known being bifunctional organosilanes bearing at least one alkoxyl functional group as Y functional group and, as X functional group, at least one functional group capable of reacting with the diene elastomer, such as, for example, a sulfur-comprising functional group.

The Applicant Company has described, in its Patent EP 1 326 871, novel hydroxysilane coupling agents capable of overcoming the disadvantages of the mercaptosilane coupling agents as described in the publications FR-A-2 094 859 and GB-A-1 310 379, which bring about, for the compositions including them, problems of premature vulcanization, also known as "scorching", and of excessive viscosity in the raw state. These novel hydroxysilane coupling agents also make it possible to overcome the disadvantages of alkoxysilane polysulfide coupling agents, as described in particular in the publications EP-A-1 043 357 and WO00/53671, especially TESPT (bis(3-triethoxysilylpropyl) tetrasulfide), which sort out the abovementioned disadvantages, but exhibit, however, the disadvantage of substantially slowing down the kinetics of vulcanization of the rubber compositions containing them, in comparison with that of the conventional compositions reinforced with carbon black.

The Applicant Company has continued these research studies and, after many years of research studies, has discovered that a specific functionalization of the coupling agent makes it possible to retain the rubber composition properties obtained with the first generation of abovementioned alkoxysilane coupling agents but also, surprisingly, that these novel coupling agents make it possible to improve the reinforcing and stiffness properties conferred on rubber compositions including them.

SUMMARY

A subject-matter of the invention is thus an alkoxysilane polysulfide, of formula (I):

$(R^3O)_{3-n}(R^1)_n Si—CH_2—(R^2)CH—Z—S_x—Z—HC(R^2)—CH_2—Si(R^1)_n(OR^3)_{3-n}$ in which:
R$^1$, which are identical or different, each represent a monovalent hydrocarbon group having from 1 to 18 carbon atoms;
R$^2$, which are identical or different, each represent a monovalent hydrocarbon group having from 1 to 4 carbon atoms;
R$^3$, which are identical or different, each represent a monovalent hydrocarbon group having from 1 to 12 carbon atoms, preferably from 1 to 6 carbon atoms;
Z, which are identical or different, each represent a divalent hydrocarbon bonding group comprising from 1 to 16 carbon atoms;
x is an integral or fractional number greater than or equal to 2;
n is an integer equal to 0, 1 or 2.

According to a favoured embodiment, the R$^3$ groups each represent an ethoxy group, the polysulfide thus corresponding to the formula (OEt=ethoxy):

$(EtO)_{3-n}(R^1)_n Si—CH_2—(R^2)CH—Z—S_x—Z—HC(R^2)—CH_2—Si(R^1)_n(OEt)_{3-n}$

Advantageously, the R$^1$ groups are chosen from $C_1$-$C_6$ alkyls, $C_5$-$C_8$ cycloalkyls and the phenyl radical, the Z groups being chosen from $C_1$-$C_{16}$ alkylenes and $C_6$-$C_{12}$ arylenes, and more preferably the R$^1$ groups are chosen from $C_1$-$C_3$ alkyls, the Z groups being chosen from $C_1$-$C_3$ alkylenes.

According to a preferred embodiment of the invention, the polysulfide consists of a bis(2-methylpropane-1,3-diyl)(triethoxylsilane) polysulfide of formula:

According to another preferred embodiment of the invention, the polysulfide consists of a bis(2-methylpropane-1,3-diyl)(dimethylethoxylsilane) polysulfide of formula:

The invention also relates to a process for producing an ethoxysilane polysulfide of formula (I) which comprises the following stages:
a hydrosilylation of an alkene of formula $R^2—C(CH_2)Z$-Hal (where Hal=halogen) with a hydrosilane of formula $Hal_{3-n}(R^1)_n Si—H$ is carried out in order to give a halogenated organosilane (hereinafter product A) of formula:

$Hal_{3-n}(R^1)_n Si—CH_2—(R^2)CH—Z-Hal$ an alcoholysis is carried out, in an inert organic solvent, on the product A in the presence of an organic or inorganic base, in order to trap the acid halide formed, and of an alcohol, in order to obtain an alkoxysilane (product C) of formula:

$(R^3O)_{3-n}(R^1)_n Si—CH_2—(R^2)CH—Z-Hal$ finally, a stage of sulfidation is carried out on the product C, by the action of a polysulfide, in order to result in the targeted product of formula (I).

The invention also relates to an elastomeric composition based on at least a diene elastomer, an inorganic filler as reinforcing filler and an alkoxysilane polysulfide as coupling agent, of formula (I):

$(R^3O)_{3-n}(R^1)_n Si—CH_2—(R^2)CH—Z—S_x—Z—HC(R^2)—CH_2—Si(R^1)_n(OR^3)_{3-n}$ (I)

in which:
R$^1$, which are identical or different, each represent a monovalent hydrocarbon group having from 1 to 18 carbon atoms;
R$^2$, which are identical or different, each represent a monovalent hydrocarbon group having from 1 to 4 carbon atoms;
R$^3$, which are identical or different, each represent a monovalent hydrocarbon group having from 1 to 12 carbon atoms, preferably from 1 to 6 carbon atoms;
Z, which are identical or different, each represent a divalent hydrocarbon bonding group comprising from 1 to 16 carbon atoms;
x is an integral or fractional number greater than or equal to 2;
n is an integer equal to 0, 1 or 2.

Finally, the invention relates to a tyre comprising a rubber composition as mentioned above.

DETAILED DESCRIPTION OF THE INVENTION

Alkoxysilane Polysulfide of the Invention
The first subject-matter of the invention is an alkoxysilane polysulfide, of formula (I)

$(R^3O)_{3-n}(R^1)_n Si—CH_2—(R^2)CH—Z—S_x—Z—HC(R^2)—CH_2—Si(R^1)_n(OR^3)_{3-n}$ (I)

or in the semi-expanded form:

in which:
R$^1$, which are identical or different, each represent a monovalent hydrocarbon group having from 1 to 18 carbon atoms;
R$^2$, which are identical or different, each represent a monovalent hydrocarbon group having from 1 to 4 carbon atoms;

R³, which are identical or different, each represent a monovalent hydrocarbon group having from 1 to 12 carbon atoms, preferably from 1 to 6 carbon atoms;

Z, which are identical or different, each represent a divalent hydrocarbon bonding group comprising from 1 to 16 carbon atoms;

x is an integral or fractional number greater than or equal to 2;

n is an integer equal to 0, 1 or 2.

Preferably, the $R^1$ groups are chosen from $C_1$-$C_6$ alkyls, $C_5$-$C_8$ cycloalkyls and the phenyl radical, the Z groups being chosen from $C_1$-$C_{16}$ alkylenes and $C_6$-$C_{12}$ arylenes, and more preferably the $R^1$ groups are chosen from $C_1$-$C_3$ alkyls, the Z groups being chosen from $C_1$-$C_3$ alkylenes.

According to a preferred alternative embodiment of the invention, the polysulfide corresponds to the formula (OEt=ethoxy):

and, more preferably still, the polysulfide corresponds to the formula (Me=methyl):

Preferably, the Z groups are chosen from methylene and ethylene.

The alkoxysilane polysulfides synthesized are in fact mixtures of polysulfides (for example from x=2 to x=9), with as consequence a mean value for x which is different from a whole value. The mean value targeted for x is preferably in a range extending from 2 to 6, more preferably in a range extending from 2 to 4.

According to a preferred embodiment of the invention, n is equal to 0 and preferably the polysulfide consists of a bis(2-methylpropane-1,3-diyl)(triethoxylsilane) polysulfide of formula:

According to another preferred embodiment of the invention, n is equal to 2 and preferably the polysulfide consists of a bis(2-methylpropane-1,3-diyl)(dimethylethoxylsilane) polysulfide of formula:

Process of Synthesis

The alkoxysilane polysulfide of formula (I) can be obtained by a process comprising the following stages:

a hydrosilylation (Scheme 1 below) of an alkene of formula $R^2$—C(CH$_2$)Z-Hal (where Hal=halogen) with a hydrosilane of general formula Hal$_{3-n}$(R$^1$)$_n$Si—H is carried out in order to give a halogenated organosilane (hereinafter product A) of formula:

Scheme 1 with $R^1$, $R^2$ and Z as defined above;

an alcoholysis by the action of an alkoxyl donor is carried out, in an inert organic solvent, on the product A in the presence of an organic or inorganic base, in order to trap the acid halide formed, the alkoxyl donor being an alcohol, in order to obtain an alkoxysilane (product C) of formula:

with $R^3$ as defined above;

finally, a stage of sulfidation is carried out on the product C (Scheme 3), by the action of a polysulfide, in order to result in the targeted product of formula (I).

According to an advantageous alternative to the process, the product C can be obtained by a hydrosilylation reaction of an alkene of formula $R^2$—C(CH$_2$)Z-Hal with a trialkoxyhydrosilane, as described, for example, by Mark D. Westmeyer in Application WO2005118598 or by Mark Paul Bowman in Application EP 0 669 338.

According to the preferred embodiment corresponding to an ethoxysilane polysulfide, the second stage of the above process is carried out as follows: an ethanolysis is carried out, in an inert organic solvent, on the product A in the presence of an organic or inorganic base, in order to trap the acid halide formed, and of ethanol, in order to obtain an alkoxysilane (product C') of formula:

with $R^1$, $R^2$ and Z as defined above.

The scheme of this reaction stage is as follows:

Finally, a stage of sulfidation is carried out on the product C (Scheme 3), by the action of a polysulfide, in order to result in the targeted product:

Scheme 3

(I)

Advantageously, Hal is chlorine.

Preferably, the organic base intended to trap the acid halide formed is a tertiary amine.

According to an alternative embodiment of the process, the alkoxyl donor is used in excess with respect to the amount of product A.

Advantageously, the polysulfide is an ammonium or metal polysulfide (x≥2), of formula $M_nS_x$ or $M'S_x$ (M=alkali metal or $NH_4$; M'=Zn or alkaline earth metal).

Preferably, it is a sodium polysulfide $Na_2S_x$, preferably generated by the action of sulfur on $Na_2S$.

More preferably still, the sulfidation stage is carried out in the aqueous phase or in a two-phase water/organic solvent medium, in the presence of a phase transfer catalyst and of a salt of formula M"Hal or M"2SO4 (M" chosen from Li, Na and K; Hal chosen from F, Cl and Br).

Use as Coupling Agent

As indicated above, the compound of the invention, by virtue of its twofold functionality, has an advantageous industrial application as coupling agent intended, for example, to provide the bonding or adhesion between a reactive polymeric matrix (in particular a rubber matrix) and any material having a hydroxylated surface, in particular an inorganic material (for example, a glass fibre) or a metal material (for example, a wire made of carbon steel or of stainless steel).

Without this being limiting, it can be used in particular for the coupling of reinforcing inorganic or white fillers and diene elastomers, for example in rubber compositions intended for the manufacture of tyres. The term "reinforcing inorganic filler" is understood as meaning, in a known way, an inorganic or mineral filler, whatever its colour and its origin (natural or synthetic), also known as "white filler" or sometimes "clear filler", in contrast to carbon black, this inorganic filler being capable of reinforcing, by itself alone, without means other than an intermediate coupling agent, a rubber composition intended for the manufacture of tyres, in other words capable of replacing, in its reinforcing role, a conventional tyre-grade carbon black filler.

Thus, the invention also relates to elastomeric compositions based on at least a diene elastomer, an inorganic filler as reinforcing filler and an ethoxysilane polysulfide as coupling agent, of formula (I) as mentioned above.

Advantageously, the diene elastomer is selected from the group consisting of polybutadienes, natural rubber, synthetic polyisoprenes, butadiene copolymers, isoprene copolymers and the mixtures of these elastomers.

For such a use, the diene elastomer is then preferably selected from the group of highly unsaturated diene elastomers consisting of polybutadienes (BRs), synthetic polyisoprenes (IRs), natural rubber (NR), butadiene/styrene copolymers (SBRs), butadiene/isoprene copolymers (BIRs), butadiene/acrylonitrile copolymers (NBRs), isoprene/styrene copolymers (SIRs), butadiene/styrene/isoprene copolymers (SBIRs) and the mixtures of these elastomers.

When the ethoxysilane polysulfide of the invention is intended for coupling (inorganic filler/diene elastomer) in a rubber composition forming, for example, all or a portion of a passenger vehicle tyre tread, the diene elastomer is then preferably an SBR or a blend (mixture) of SBR and of another diene elastomer, such as BR, NR or IR. In the case of an SBR elastomer, use is made in particular of an SBR having a styrene content of between 20% and 30% by weight, a content of vinyl bonds of the butadiene part of between 15% and 65%, a content of trans-1,4-bonds of between 15% and 75% and a glass transition temperature (Tg—measured according to Standard ASTM D3418-82) of between −20° C. and −55° C., this SBR copolymer, preferably prepared in solution (SSBR), optionally being used as a mixture with a polybutadiene (BR) preferably having more than 90% of cis-1,4-bonds.

When the tread is intended for a utility tyre, such as a heavy duty vehicle tyre, the diene elastomer is then preferably an isoprene elastomer, that is to say a diene elastomer selected from the group consisting of natural rubber (NR), synthetic polyisoprenes (IRs), the various isoprene copolymers and the mixtures of these elastomers; it is then more preferably natural rubber or a synthetic polyisoprene of the cis-1,4-type having a content (mol %) of cis-1,4-bonds of greater than 90%, more preferably still of greater than 98%.

The ethoxysilane polysulfides of the invention have proved to be sufficiently effective by themselves alone for the coupling of a diene elastomer and a reinforcing inorganic filler, such as silica, used in particular as predominant reinforcing filler. Preferably, the content of reinforcing filler will be chosen between 10 and 200 phr, more preferably between 30 and 150 phr, in particular greater than 50 phr, and more preferably still between 60 and 140 phr.

Preferably, the ethoxysilane polysulfides are used at a content of greater than 1 phr (parts by weight per hundred parts of elastomer), more preferably of between 2 and 20 phr. They can advantageously constitute the sole coupling agent present in rubber compositions reinforced with inorganic filler and intended for the manufacture of tyres.

Mention will be made, as reinforcing inorganic filler, of mineral fillers of the siliceous type, in particular silica ($SiO_2$), or of the aluminous type, in particular alumina ($Al_2O_3$), or of aluminium (oxide) hydroxides, or also of reinforcing titanium oxides, as described in the abovementioned patents or patent applications.

Highly dispersible precipitated silicas (HDSs) are preferred, in particular when the invention is employed in the manufacture of tyres exhibiting a low rolling resistance; mention may be made, as examples of such silicas, of the Ultrasil 7000 silicas from Evonik, the Zeosil 1165MP, 1135MP, 1115MP and Premium 200MP silicas from Solvay, the Hi-Sil EZ150G silica from PPG or the Zeopol 8715, 8745 and 8755 silicas from Huber.

The reinforcing inorganic filler can be used also combined with a reinforcing organic filler, in particular carbon black.

The amount of carbon black present in the total reinforcing filler can vary within wide limits; it is preferably less than that of the reinforcing inorganic filler. Advantageously, carbon black is used in a very low proportion, with a content of between 2 and 20 phr and preferably at a content of less than 10 phr.

Such rubber compositions also comprise, in a known way, a crosslinking system, preferably a vulcanization system, that is to say a system based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulfur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

According to a preferred alternative embodiment of the invention, zinc and any zinc derivative, such as ZnO, are excluded among the secondary vulcanization accelerators or vulcanization activators used or they can be used in accordance with the 0.5 phr maximum of zinc in the composition, and preferably less than 0.3 phr. Furthermore, according to another preferred alternative form, guanidine derivatives, such as diphenylguanidine, are excluded.

The rubber compositions in accordance with the invention can also comprise all or a portion of the normal additives customarily used in elastomer compositions intended for the manufacture of tyres, in particular of treads, such as, for example, plasticizers or extender oils, whether the latter are aromatic or non-aromatic in nature, pigments, protective agents, such as antiozone waxes, chemical antiozonants or antioxidants, anti-fatigue agents, reinforcing resins, methylene acceptors (for example, phenolic novolak resin) or methylene donors (for example, HMT or H3M), such as described, for example, in Application WO 02/10269, a crosslinking system based either on sulfur or on sulfur-donating agents and/or on peroxide and/or on bismaleimides, vulcanization accelerators or vulcanization activators.

Manufacture of the Rubber Compositions

The rubber compositions of the invention are manufactured in appropriate mixers, using two successive phases of preparation according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., during which finishing phase the crosslinking or vulcanization system is incorporated.

It is possible to envisage one or more additional stages targeted at preparing masterbatches of elastomer and of reinforcing filler which are intended to be introduced during the first working phase.

The compositions thus obtained are subsequently calendered in the form of plaques (thickness of 2 to 3 mm) or of thin sheets of rubber, for the measurement of their physical or mechanical properties, or extruded in order to form profiled elements which can be used directly, after cutting and/or assembling to the desired dimensions, for example as semi-finished products for tyres, in particular as tyre treads.

IMPLEMENTATIONAL EXAMPLES OF THE INVENTION

Figure 1:
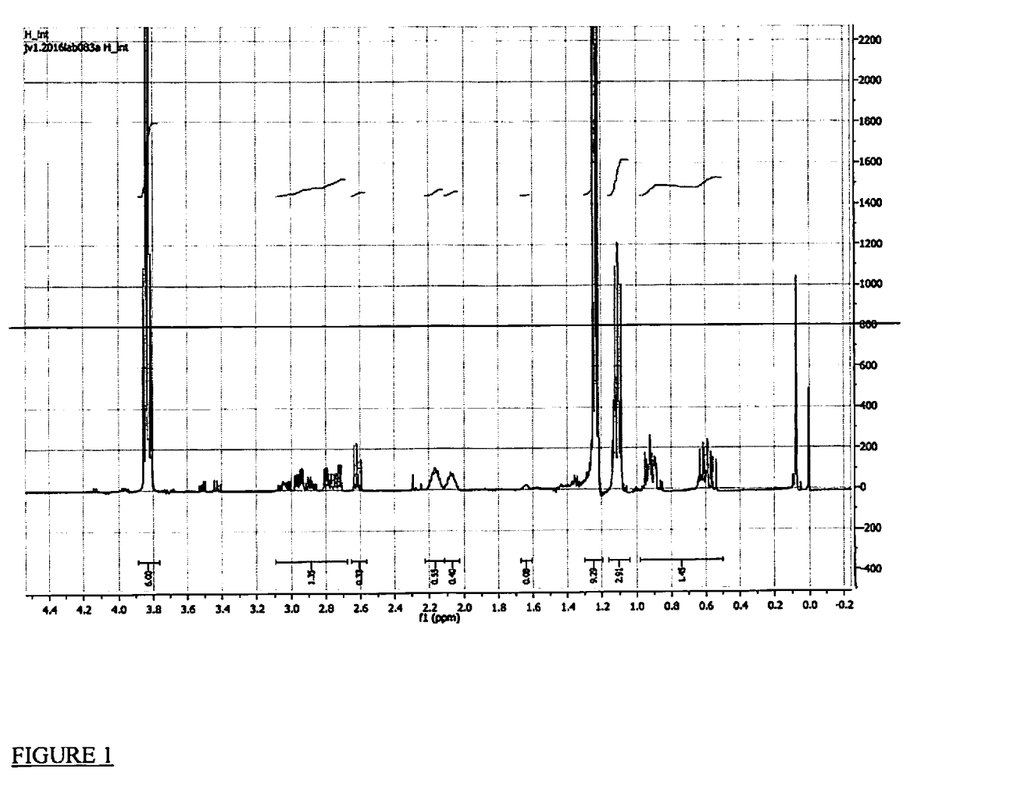
FIG. 1 is the NMR spectra of bis(2-methylpropane-1,3-diyl)(triethoxylsilane) (product B1).
Figure 2:
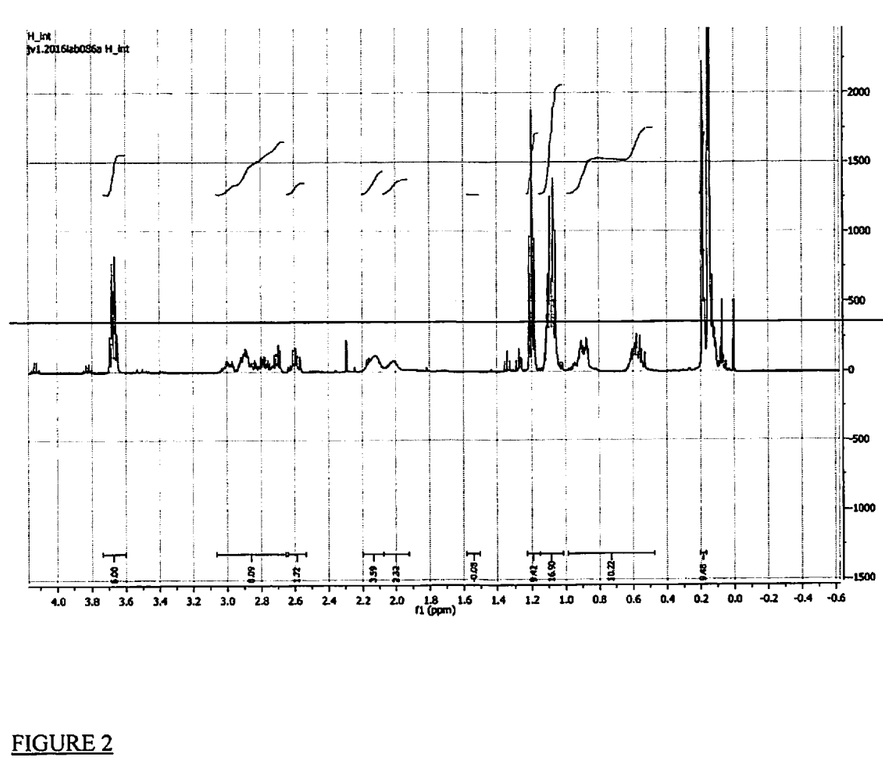
FIG. 2 is the NMR spectra of bis(2-methylpropane-1,3-diyl)(dimethylethoxylsilane) (product B2).

The implementational examples which follow present in particular the synthesis of bis(2-methylpropane-1,3-diyl) (triethoxyl silane) (product B1) and of bis(2-methylpropane-1,3-diyl)(dimethylethoxylsilane) (product B2), illustrated by FIGS. 1 and 2, which represent the NMR spectra of each of these products.

Synthesis of Chloroisobutyltriethoxysilane

This compound can be obtained by applying, to triethoxyhydrosilane, the procedure described, for example, by Mark D. Westmeyer in Application WO2005118598 or by Mark Paul Bowman in Application EP 0 669 338, i.e. a hydrosilylation reaction, catalysed by a ruthenium complex, with an alkene of formula $R^2—C(CH_2)Z-Hal$.

Synthesis of bis(2-methylpropane-1,3-diyl)(triethoxylsilane) (Product B1)

The reaction is carried out in a 2-litre round-bottomed flask equipped with a temperature control system, with a reflux condenser, with a mechanical stirrer and with a dropping funnel. The equipment is purged beforehand with nitrogen for 1 hour.

Sulfur (10.41 g), sodium sulfide nonahydrate (44.48 g) and sodium chloride (33.14 g) are added to a two-phase mixture of water (665.0 g) and toluene (126.3 g). The temperature of the mixture is brought to 80° C. and the medium is stirred at this temperature for 120 minutes. The reaction medium becomes red from the time of the dissolution of the salts.

Tetrabutylammonium chloride (9.94 g, in solution at 50% in toluene) is added at 86° C. Immediately afterwards, a solution of chloroisobutyltriethoxysilane (61.0 g) in toluene (457 g) is placed in the dropping funnel and is added dropwise. The addition lasts 2 hours and the temperature of the reaction medium is maintained between 84 and 86° C. After the end of the addition, the reaction medium is stirred for an additional 3 hours at 85° C. An analysis of the mixture by gas chromatography makes it possible to confirm the complete consumption of the starting chloroisobutyltriethoxysilane.

The temperature of the reaction medium is slowly brought back to ambient temperature. The aqueous phase is separated. 800 ml of water are added to the organic phase. The mixture is stirred at ambient temperature and then the aqueous and organic phases are separated. This washing is repeated six times so that the pH of the phase is equal to 7.

The organic phase is concentrated under at 30° C. at a pressure of less than 1 mm/Hg (affected by this pressure in 40 minutes). The oil obtained is concentrated under 1 mm/Hg at 30° C. for 1 h 30. 40 g of a brown oil are obtained.

The NMR spectrum of the product B1 obtained is presented in FIG. 1.

Synthesis of bis(2-methylpropane-1,3-diyl)(dimethylethoxyl silane) (Product B2)

The reaction is carried out in a 2-litre round-bottomed flask equipped with a temperature control system, with a reflux condenser, with a mechanical stirrer and with a dropping funnel. The equipment is purged beforehand with nitrogen for 1 hour.

Sulfur (10.33 g), sodium sulfide nonahydrate (44.49 g) and sodium chloride (33.45 g) are added to a two-phase mixture of water (365.0 g) and toluene (115.8 g). The temperature of the mixture is brought to 80° C. and the medium is stirred at this temperature for 120 minutes. The reaction medium becomes red from the time of the dissolution of the salts.

Tetrabutylammonium chloride (10.5 g, in solution at 50% in toluene) is added at 86° C. Immediately afterwards, a solution of chloroisobutyldimethylethoxysilane (47.67 g) in toluene (449.91 g) is placed in the dropping funnel and is added dropwise. The addition lasts 2 hours and the temperature of the reaction medium is maintained between 84 and 86° C. After the end of the addition, the reaction medium is stirred for an additional 3 hours at 85° C. An analysis of the mixture by gas chromatography makes it possible to confirm the complete consumption of the starting chloroisobutyldimethylethoxysilane.

The temperature of the reaction medium is slowly brought back to ambient temperature. The aqueous phase is separated. 800 ml of water are added to the organic phase. The mixture is stirred at ambient temperature and then the aqueous and organic phases are separated. This washing is repeated six times so that the pH of the phase is equal to 7.

The organic phase is concentrated under at 30° C. at a pressure of less than 1 mm/Hg (affected by this pressure in 40 minutes). The oil obtained is concentrated under 1 mm/Hg at 30° C. for 1 h 30. 39 g of a brown oil are obtained.

The NMR spectrum of the product B2 obtained is presented in FIG. 2.

Preparation of the Rubber Compositions

The tests which follow are carried out in the following way: the diene elastomer (or the mixture of diene elastomers, if appropriate), the reinforcing filler, the coupling agent and then the various other ingredients, with the exception of the vulcanization system, are introduced into an internal mixer which is 70% filled and which has an initial vessel temperature of approximately 60° C. Thermomechanical working is then carried out (non-productive phase) in one or two stages (total duration of the kneading equal to approximately 7 min), until a maximum "dropping" temperature of approximately 165° C. is reached. The mixture thus obtained is recovered and cooled and then sulfur and sulfenamide accelerator are added on an external mixer (homofinisher) at 30° C., everything being mixed (productive phase) for 3 to 4 minutes.

The compositions thus obtained are subsequently calendered in the form of plaques (thickness of 2 to 3 mm) or of thin sheets of rubber, for the measurement of their physical or mechanical properties, or extruded in order to form profiled elements which can be used directly, after cutting and/or assembling to the desired dimensions, for example as semi-finished products for tyres, in particular as tyre treads.

Measurements and Tests Used

The rubber compositions are characterized, before and after curing, as indicated below.

Tensile Tests

These tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e. after an accommodation cycle at the extension rate provided for the measurement itself) at 10% elongation (denoted M10), 100% elongation (denoted M100) and 300% elongation (denoted M300). The breaking stresses (in MPa) and the elongations at break (in %) are also measured. All these tensile measurements are carried out under the standard conditions of temperature and hygrometry according to French Standard NF T 40-101 (December 1979).

Rheometry

The measurements are carried out at 150° C. with an oscillating disc rheometer, according to Standard DIN 53529—Part 3 (June 1983). The change in the rheometric torque, ΔTorque, as a function of the time describes the change in the stiffening of the composition as a result of the vulcanization reaction. The measurements are processed according to Standard DIN 53529—Part 2 (March 1983): $T_0$ is the induction period, that is to say the time necessary for the start of the vulcanization reaction; $T_\alpha$ (for example $T_{99}$) is the time necessary to achieve a conversion of α %, that is to say α % (for example 99%) of the difference between the minimum (TMin) and maximum (TMax) torques. The conversion rate constant, denoted K (expressed in $min^{-1}$), which is first order, calculated between 30% and 80% conversion, which makes it possible to assess the vulcanization kinetics, is also measured.

Test

The aim of this test is to demonstrate the improved performance qualities of compositions in accordance with the invention, compared with a conventional composition using TESPT.

Three compositions in accordance with the process explained in the preceding section, based on SBR, reinforced predominantly with silica, are thus prepared, which compositions differ from one another in the nature of their coupling agent, these coupling agents being used in an isomolar silicon content, and in the presence or the absence of zinc oxide (ZnO), as follows:

the conventional control composition C1, not in accordance with the invention, comprises, as coupling agent, TESPT and also, conventionally, ZnO, the control composition C2, not in accordance with the invention, comprises, as coupling agent, a conventional silane disulfide and also, conventionally, ZnO, the composition C3, in accordance with the invention, comprises, as coupling agent, the product B1 and also ZnO, the composition C4, in accordance with the invention, comprises, as coupling agent, the product B1 but is devoid of ZnO.

It should be remembered that TESPT is bis(3-triethoxysilylpropyl) tetrasulfide, of formula $[(C_2H_5O)_3Si(CH_2)_3S_2]_2$; it is sold, for example, by Evonik under the name Si69 (or X50S when it is supported at 50% by weight on carbon black) or also by Witco under the name Silquest A1289 (in both cases, commercial mixture of polysulfides $S_x$ with a mean value for x which is approximately 4).

13

The expanded formula for TESPT is:

Likewise, the silane disulfide coupling agent bis(triethoxysilylpropyl) disulfide, such as sold by Evonik under the reference Si75, is well known.

The formulation of the four compositions (contents of the various products expressed in phr) and their properties after curing (approximately 30 min at 150° C.) are given in Tables 1 and 2 respectively.

It is found, in the light of Table 2, surprisingly, that the compositions C3 and C4 in accordance with the invention exhibit reinforcing (M300/M100) properties which are significantly improved in comparison with the two control compositions C1 and C2 and also a marked improvement in the processability (Tmin). Surprisingly, it is found that these improvements in performance qualities for the compositions in accordance with the invention take place equally well in compositions with ZnO as in compositions without ZnO.

TABLE 1

| Compositions | C1 | C2 | C3 | C4 |
| --- | --- | --- | --- | --- |
| SBR (1) | 100 | 100 | 100 | 100 |
| Carbon black (2) | 4 | 4 | 4 | 4 |
| Silica (3) | 110 | 110 | 110 | 110 |
| Silane (4) | 8.8 | — | — | — |
| Silane (5) | — | 8.1 | — | — |
| Silane (6) | — | — | 9.0 | 9.0 |
| Resin (7) | 45 | 45 | 45 | 45 |
| Oil (8) | 17 | 17 | 17 | 17 |
| Octadecylamine wax | 1.8 | 1.8 | 1.8 | 1.8 |
| DPG (9) | 2 | 2 | 2 | 2 |
| ZnO | 1 | 1 | 1 | — |
| Stearic acid | 2 | 2 | 2 | 2 |
| Antioxidant (10) | 2.7 | 2.7 | 2.7 | 2.7 |
| Sulfur* | 1.1 | 1.8 | 1.8 | 1.8 |
| Accelerator (11) | 2.3 | 2.3 | 2.3 | 2.3 |

(1) SBR with 27% of styrene units and 24% of 1,2- units of the butadiene part (Tg = −48° C.) bearing a silanol functional group at the elastomer chain end, and comprising as a minor component by weight chains of the same microstructure but Sn star-branched;
(2) Carbon black N234, sold by Cabot Corporation;
(3) "HD"-type silica, Zeosil 1165MP from Solvay;
(4) TESPT (Si69 ® from Evonik);
(5) Si75 ® (bis(triethoxysilylpropyl) disulfide from Evonik);
(6) Product B1 (bis(2-methylpropane-1,3-diyl)(triethoxylsilane) (product B1));
(7) Polylimonene resin (Resine THER 8644 from Cray Valley);
(8) Sunflower oil, Lubrirob Tod 1880 from Novance;
(9) Diphenylguanidine (Vulkacit D from Bayer);
(10) N-(1,3-Dimethylbutyl)-N'-phenyl-para-phenylenediamine (Santoflex 6-PPD from Flexsys);
(11) N-Cyclohexyl-2-benzothiazolesulfenamide (Santocure CBS from Flexsys).
*The sulfur contents were adjusted in order to take into account the release of sulfur which takes place with TESPT not with the products Si75 or B1 (disulfide S₂ foot).

TABLE 2

| Compositions | C1 | C2 | C3 | C4 |
| --- | --- | --- | --- | --- |
| Properties in the raw condition | | | | |
| Tmin | 1.46 | 1.47 | 1.33 | 1.36 |
| Properties in the cured condition | | | | |
| M300/M100 | 1.46 | 1.56 | 1.58 | 1.67 |

14

The invention claimed is:
1. An alkoxysilane polysulfide of formula (I):

in which:
R$^1$, which are identical or different, each represent a monovalent hydrocarbon group having from 1 to 18 carbon atoms;
R$^2$, which are identical or different, each represent a monovalent hydrocarbon group having from 1 to 4 carbon atoms;
R$^3$, which are identical or different, each represent a monovalent hydrocarbon group having from 1 to 12 carbon atoms;
Z, which are identical or different, each represent a divalent hydrocarbon bonding group comprising from 1 to 16 carbon atoms;
x is an integral or fractional number greater than or equal to 2; and
n is an integer equal to 2.
2. The alkoxysilane polysulfide according to claim 1, wherein each R$^3$ represents an ethoxy group.
3. The alkoxysilane polysulfide according to claim 1, wherein x is within a range extending from 2 to 4.
4. The alkoxysilane polysulfide according to claim 1, wherein each R$^1$ is selected from the group consisting of $C_1$-$C_6$ alkyls, $C_5$-$C_8$ cycloalkyls and the phenyl radical, and each Z group is selected from the group consisting of $C_1$-$C_{16}$ alkylenes and $C_6$-$C_{12}$ arylenes.
5. The alkoxysilane polysulfide according to claim 4, wherein each R$^1$ group is selected from the group consisting of $C_1$-$C_3$ alkyls, and each Z group is selected from the group consisting of methylene and ethylene.
6. The alkoxysilane polysulfide according to claim 5, wherein each R$^1$ and R$^2$ is methyl.
7. The alkoxysilane polysulfide according to claim 1, wherein the alkoxysilane polysulfide consists of bis(2-methylpropane-1,3-diyl)(dimethylethoxylsilane) polysulfide of formula:

8. A process for producing an alkoxysilane polysulfide of formula (I) according to claim 1, the process comprising the following steps:
carrying out hydrosilylation of an alkene of formula R$^2$—C(CH$_2$)Z-Hal, where Hal is halogen, with a hydrosilane of formula Hal$_{3-n}$(R$^1$)$_n$Si-H in order to give a halogenated organosilane of formula:

carrying out alcoholysis, in an inert organic solvent, on the halogenated organosilane of formula (A) in the presence of an organic or inorganic base, in order to trap an acid halide formed, and of an alcohol, in order to obtain an alkoxysilane of formula:

carrying out sulfidation on the alkoxysilane of formula (C), by the action of a polysulfide, in order to result in the alkoxysilane polysulfide of formula (I).
9. The process according to claim 8, wherein Hal is chlorine.
10. The process according to claim 8, wherein the organic base intended to trap the acid halide formed is a tertiary amine.

11. The process according to claim 8, wherein the polysulfide is an ammonium or metal polysulfide (x≥2), of formula $M_2S_x$ or $M'S_x$ with M=alkali metal or $NH_4$ and M'=Zn or alkaline earth metal.

12. The process according to claim 11, wherein the polysulfide is a sodium polysulfide $Na_2S_x$.

13. The process according to claim 8, wherein the sulfidation stage is carried out in the aqueous phase or in a two-phase water/organic solvent medium, in the presence of a phase transfer catalyst and of a salt of formula M"Hal or M"$_2$SO$_4$ with M" chosen from Li, Na and K and Hal chosen from F, Cl and Br.

14. An elastomeric composition based on at least a diene elastomer, an inorganic filler as reinforcing filler and an alkoxysilane polysulfide as coupling agent, of formula (I):

$(R^3O)_{3-n}(R^1)_n Si-CH_2-(R^2)CH-Z-S_x-Z-HC(R^2)-CH_2-Si(R^1)_n(OR^3)_{3-n}$  (I), in which:
- $R^1$, which are identical or different, each represent a monovalent hydrocarbon group having from 1 to 18 carbon atoms;
- $R^2$, which are identical or different, each represent a monovalent hydrocarbon group having from 1 to 4 carbon atoms;
- $R^3$, which are identical or different, each represent a monovalent hydrocarbon group having from 1 to 12 carbon atoms;
- Z, which are identical or different, each represent a divalent hydrocarbon bonding group comprising from 1 to 16 carbon atoms;
- x is an integral or fractional number greater than or equal to 2; and
- n is an integer equal to 2.

15. The elastomeric composition according to claim 14, wherein x is within a range extending from 2 to 4.

16. The elastomeric composition according to claim 14, wherein each $R^1$ group is selected from the group consisting of $C_1$-$C_3$ alkyls, and each Z group is selected from the group consisting of methylene and ethylene.

17. The elastomeric composition according to claim 14, wherein the alkoxysilane polysulfide of formula (I) consists of a bis(2-methylpropane-1,3-diyl)(dimethylethoxylsilane) polysulfide.

18. The elastomeric composition according to claim 14, wherein the diene elastomer is selected from the group consisting of polybutadienes, natural rubber, synthetic polyisoprenes, butadiene copolymers, isoprene copolymers and mixtures thereof.

19. The elastomeric composition according to claim 14, wherein a content of reinforcing inorganic filler is between 30 and 150 phr, and the reinforcing filler is predominantly silica.

20. A tire comprising the elastomeric composition according to claim 14.

* * * * *